United States Patent [19]
Varsane

[11] 4,293,890
[45] Oct. 6, 1981

[54] CERAMIC CAPACITOR WITH END TERMINALS

[75] Inventor: Robert G. Varsane, Oxford, Conn.

[73] Assignee: Vitramon Incorporated, Monroe, Conn.

[21] Appl. No.: 80,174

[22] Filed: Oct. 1, 1979

[51] Int. Cl.³ .............................................. H01G 1/14
[52] U.S. Cl. ................................ 361/310; 361/321; 339/258 P
[58] Field of Search ......................... 361/310, 321; 174/52 IP; 339/258 P, 258 R

[56] References Cited

U.S. PATENT DOCUMENTS

| | | | |
|---|---|---|---|
| 1,574,424 | 2/1926 | Hatch | 361/310 X |
| 2,830,698 | 4/1958 | Coda | 361/321 X |
| 3,564,360 | 2/1971 | Zimmerman | 361/310 |
| 4,037,915 | 7/1977 | Cabaud | 339/258 P |
| 4,140,361 | 2/1979 | Sochor | 339/258 P |
| 4,164,725 | 8/1979 | Wiebe | 339/258 R X |

Primary Examiner—Elliot A. Goldberg
Attorney, Agent, or Firm—Arnold Grant

[57] ABSTRACT

A lead wire for a miniature capacitor having a U-shaped clamp at one end and being removably attached to a carrier, such as a sprocketed ribbon, at the other end. Each of the U-shaped clamps grasps and holds a terminal end of the capacitor. The carrier is used with conventional geared wheels and reels to move the capacitors and lead wires from station to station during their assembly procedure. When assembly is completed, the leads can be removed from the carrier.

4 Claims, 3 Drawing Figures

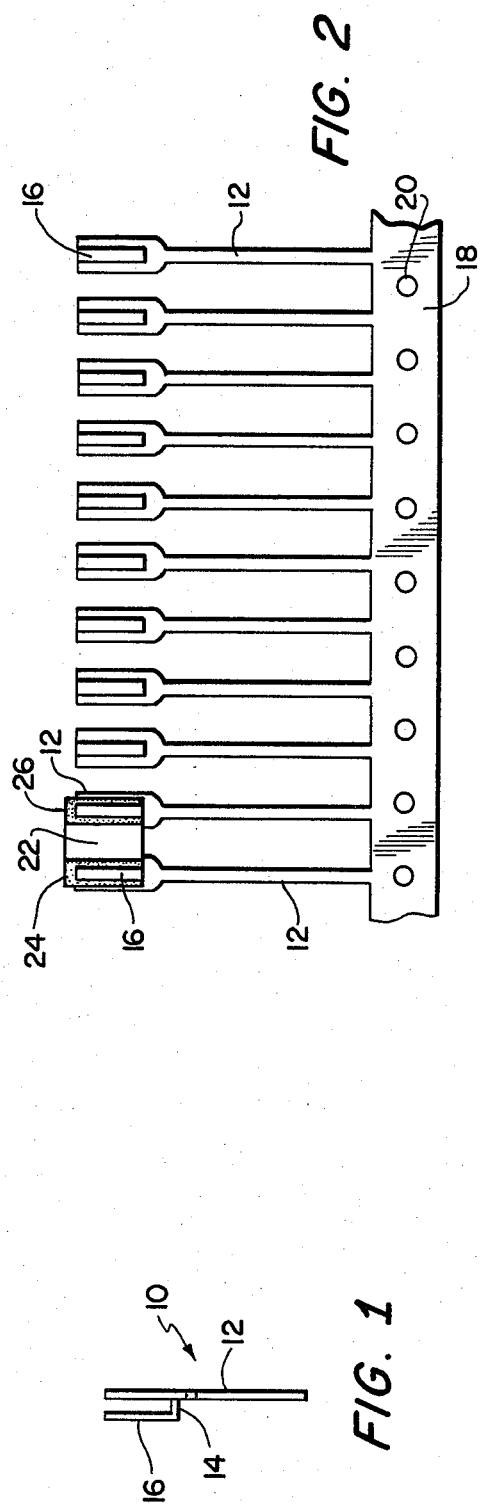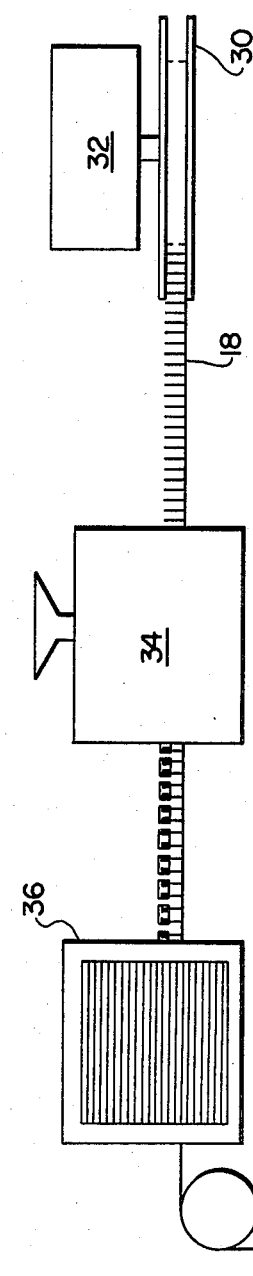

CERAMIC CAPACITOR WITH END TERMINALS

BACKGROUND OF THE INVENTION

The present invention relates to a conductive lead for miniature capacitors and a process for joining such conductive leads onto miniature capacitors. More particularly, the present invention is related to a conductive lead suitable for use with an automated process for positioning conductive leads relative to the terminals of a miniature ceramic capacitor and for fixing the leads to the terminals.

Present technology for joining conductive leads onto miniature capacitors, i.e., capacitors wherein the major dimension is on the order of less than about 0.300 inch, has not kept pace with the increased demand for such capacitors. Aside from joining the lead wires by hand, which is a painstaking procedure considering the relative dimensions of the articles involved, the most common procedure is to attach a row of U-shaped lead wires to a carrier, such as a piece of cardboard, cross one leg of each U over the other to create a spring-like tension between the opposed legs, insert the capacitor between the legs, and then solder the lead to the capacitor. The major disadvantage to this method is that, prior to soldering, each of the lead wires grasps the capacitor at an acute angle along opposing bottom edges of the capacitor, and thus the same spring-like tension which holds the capacitor between the legs also has an upward vector which acts on the edges to squeeze the capacitor out of such grasp. As such, while many capacitors will be held in place until the lead wires can be permanently connected, an unacceptable number of capacitors slip from the grasp of the lead wires and must be reinserted. Equally as deleterious, the juncture of the capacitor and each of the lead wires is point-to-point along the bottom edge of the capacitor, which is the smallest dimension of the capacitor. Thus, even after the capacitor is soldered to the lead wire the mechanical integrity of this point-to-point juncture is somewhat tenuous, notwithstanding the surrounding body of solder, and prone to failure.

Another common procedure is to form each of the lead wires with a step or platform intermediate the ends of the lead wire and to rest the capacitor on the platform against the lead wire. While this method overcomes the problem of the lead wires "ejecting" the capacitor and increases the surface contact between the lead wire and the capacitor, it requires the use of an external clamping device to hold the capacitor on the platform and against the lead wire when the capacitor is inverted, during subsequent processing, as for example, when it is dipped into a bath of solder, etc. The coordination of interaction between the clamping device, lead wires and capacitor can be difficult, given the size of the elements, and can result in misalignment and unacceptable components.

There thus exists a need in the art for a process which can quickly, efficiently, and effectively position a lead wire adjacent to the terminals of a miniature chip capacitor and can maintain the integrity of such a juxtaposition during the various steps which may be necessary to permanently join the lead wire and the capacitor.

SUMMARY OF THE INVENTION

The present invention addresses this need and provides a novel conductive lead wire and a process for using such lead wire. Each of the lead wires of the present invention has a U-shaped clamp at one end, and is removably connected to a sprocketed ribbon at the other end. The lead wires are positioned on the sprocketed ribbon on centers which correspond to the major dimension of the miniature capacitor. As such, a capacitor will be grasped about each of its end terminals by the U-shaped clamp of lead wire. The spacing and spring-like tension between the legs of each of the U-shaped clamps is such that they will grasp and hold the capacitor tightly without regard to the attitude assumed by the capacitor during subsequent processing to permanently affix the lead wires to the capacitor.

The sprocketed ribbon, at the other end of the lead wires, is used, in conjunction with conventional geared wheels and reels, etc., to move the capacitors from station to station for the various operations necessary to permanently join the lead wires and capacitor and otherwise complete manufacture of the lead capacitor. Upon completion of manufacturing operations, the leads are disconnected from the sprocketed ribbon.

BRIEF DESCRIPTION OF THE DRAWINGS

These and other aspects of the invention will be more fully understood by reference to the following detailed description and accompanying drawings in which:

FIG. 1 is a side view of a conductive lead wire according to the present invention;

FIG. 2 is a side view of a series of conductive lead wires according to the present invention removably attached to a sprocketed ribbon; and, FIG. 3 is a pictorial representation of a process for fixedly connecting the conductive lead wire according to the present invention to a miniature ceramic capacitor.

DETAILED DESCRIPTION OF THE INVENTION

The present invention relates to a conductive lead for miniature capacitors and to a process of fixedly attaching such lead to a capacitor. Miniature capacitors, often referred to as chip capacitors, usually consist of alternate layers of electrically non-conductive ceramic dielectric material which separate alternately polarizable refractory, electrically conductive metal electrodes. The structure is generated in a "green" state and fired. The ceramic provides not only the dielectric layers but also the mechanical matrix for the electrodes and the encasement system which affords the unit its physical geometry and environmental protection.

Layers of electrode material commonly extend to opposite ends of the capacitor and are interconnected at the ends by a metal coating composition, usually a noble metal such as silver combined with a glass, which is also fired, and thereby bonded to the ends of the capacitor. The metal coating composition of the ends not only connects each electrode layer of like polarity but also provides a solderable media.

Miniature capacitors are usually formed as a six-sided monolith with the largest single surface dimension being less than about 0.300 inch. The monolith consists of two end terminals, two major surfaces, i.e., a top and bottom, both of which are in planes substantially parallel to the planes of the electrodes of the capacitor, and two side surfaces, both of which are in planes substantially perpendicular to the electrodes of the capacitor.

Referring now to FIGS. 1 and 2 the conductive lead 10 according to the present invention comprises first leg 12, base 14 extending outwardly from the first leg, and second leg 16, which extends substantially perpendicular to base 14. The spacing between first and second legs 12 and 16 is such that they will grasp and tightly hold a miniature capacitor between them even when the capacitor is inverted for any subsequent processing operations. The height of legs 12 and 16 is also designed to go at least one-half way along the side of the capacitor and thus to hold and support the capacitor during subsequent processing operations. The leads may be composed of any conductive material such as copper, silver, gold, platinum, palladium or aluminum, etc.

A group of conductive leads are removably attached to a carrier such as ribbon 18, which preferably has a series of regularly spaced openings or sprocket holes 20. By removably attached to the carrier is meant that the conductive leads can be readily severed from the carrier, such as with a sharp edge or cutting blade. The ribbon 18 may be formed of any material, although for simplicity of manufacture it is preferred to form it of the same material as the conductive leads, i.e., silver, copper, gold, platinum, palladium, or aluminum, etc. The conductive leads 10 are positioned on the ribbon on centers which correspond to the major dimensions of the miniature capacitors to which they are to be joined. In this manner the miniature capacitor 22 is grasped about each of its end terminals 24, 26 by the legs 12, 16 of a lead wire.

As best shown in FIG. 3, the sprocketed ribbon 18 is payed off of reel 30 driven by motor 32 to a capacitor insertion station 34. The terminal ends of the miniature capacitors are then individually inserted by automatic means (not shown) into the U-shaped clamp formed by legs 12 and 16 and base 14 of the conductive lead where they are held in place by the spring-like tension between legs 12 and 16. The capacitors and conductive leads are then moved serially to a foam fluxer station 36, a preheater 38, a solder bath 40 and an ultrasonic cleaner 42. As diagramatically shown, the capacitors will be held in place relative to the conductive leads even when they are moved at high speed over geared wheels or through the various stations and operations necessary to permanently join the conductive lead to the miniature capacitor.

After the conductive lead is soldered to the miniature capacitor, the capacitor, while still attached to the sprocketed ribbon 18, may be encapsulated, such as by dipping it in a bath of epoxy, marked and tested. Testing is a particularly simple process with the present invention. One lead from a selected capacitor can be severed from the carrier 18 and the carrier and the end of the severed lead connected to the testing device. Since the other capacitors on the carrier have both of their leads attached to the carrier they are effectively shorted out and are unaffected by the test. After testing, the capacitors may either be individually removed from the sprocketed ribbon 18 by passing a cutting edge between leg 12 of the conductive leads and the ribbon or the leads may remain attached to the ribbon and the ribbon cut into sections containing a desired number of capacitors attached thereto.

As this invention may be embodied in several forms without departing from the spirit or essential character thereof the present embodiments are illustrative and not restrictive. The scope of the invention is defined by the appended claims rather than by the description preceding them and all embodiments which fall within the meaning and range of equivalency of the claims are, therefore, intended to be embraced by those claims.

What is claimed is:

1. In combination a carrier for a monolithic ceramic capacitor and such capacitor, the capacitor comprising a dielectric material body, a first and a second major surface, two side surfaces and a first and a second end terminal; the carrier comprising a first conductive lead holding the capacitor adjacent the first end terminal and a second conductive lead holding the capacitor adjacent the second end terminal, each conductive lead having a first leg, said first leg having a first end and a second end, wherein the first end abuts against the first major surface of the capacitor and the second end is removably attached to a ribbon having a series of regularly spaced openings therein, a base extending outwardly from the first leg and abutting against a side surface of the capacitor and a second leg, connected at one end thereof to the base and abutting against the second major surface of the capacitor.

2. A carrier as defined in claim 1 wherein the first and second conductive leads are bonded to the capacitor by solder.

3. A carrier is defined in claim 1 wherein the conductive leads and the sprocketed ribbon are made of the same material.

4. In combination a carrier for a plurality of monolithic ceramic capacitors, and such capacitors, each such capacitor comprising a dielectric material body, a first and a second major surface, two side surfaces and a first and a second end terminal; the carrier comprising for each capacitor a first conductive lead holding the capacitor adjacent the first end terminal and a second conductive lead holding the capacitor adjacent the second end terminal, each conductive lead having a first leg, said first leg having a first end and a second end, wherein the first end abuts against the first major surface of the capacitor and the second end is removably attached to a ribbon having a series of regularly spaced openings therein, a base extending outwardly from the first leg and abutting against a side surface of the capacitor and a second leg, connected at one end thereof to the base and abutting against the second major surface of the capacitor.

* * * * *